United States Patent
Oggianu et al.

(10) Patent No.: US 8,590,672 B2
(45) Date of Patent: Nov. 26, 2013

(54) MANAGEMENT OF POWER FROM MULTIPLE SOURCES IN AN ELEVATOR POWER SYSTEM

(75) Inventors: Stella M. Oggianu, Manchester, CT (US); Vladimir Blasko, Avon, CT (US); Robert K. Thornton, Coventry, CT (US); William A. Veronesi, Hartford, CT (US); Lei Chen, South Windsor, CT (US)

(73) Assignee: Otis Elevator Company, Farmington, CT (US)

( * ) Notice: Subject to any disclaimer, the term of this patent is extended or adjusted under 35 U.S.C. 154(b) by 370 days.

(21) Appl. No.: 13/059,119

(22) PCT Filed: Aug. 15, 2008

(86) PCT No.: PCT/US2008/009811
§ 371 (c)(1),
(2), (4) Date: Feb. 15, 2011

(87) PCT Pub. No.: WO2010/019126
PCT Pub. Date: Feb. 18, 2010

(65) Prior Publication Data
US 2011/0147130 A1   Jun. 23, 2011

(51) Int. Cl.
*B66B 1/06* (2006.01)

(52) U.S. Cl.
USPC .......................................... 187/290; 187/393

(58) Field of Classification Search
USPC ............... 187/290, 293, 295, 296, 297, 247, 187/391–393; 318/375, 376, 380, 798–815; 307/66, 69; 700/275, 297
See application file for complete search history.

(56) References Cited

U.S. PATENT DOCUMENTS

| | | | |
|---|---|---|---|
| 5,896,948 A * | 4/1999 | Suur-Askola et al. | 187/290 |
| 6,315,081 B1 * | 11/2001 | Yeo | 187/290 |
| 6,415,892 B2 * | 7/2002 | Araki et al. | 187/290 |
| 6,422,351 B2 * | 7/2002 | Tajima et al. | 187/290 |
| 6,460,658 B2 * | 10/2002 | Suga et al. | 187/290 |
| 6,474,447 B2 * | 11/2002 | Tajima et al. | 187/290 |
| 6,827,182 B2 * | 12/2004 | Araki | 187/290 |
| 7,540,356 B2 * | 6/2009 | Smith et al. | 187/393 |

(Continued)

FOREIGN PATENT DOCUMENTS

| | | |
|---|---|---|
| JP | 2001171921 A | 6/2001 |
| JP | 2001187677 A | 7/2001 |

(Continued)

OTHER PUBLICATIONS

Official Search Report and Written Opinion of the Patent Cooperation Treaty Office in foreign counterpart Application No. PCT/US2008/009811, filed Aug. 15, 2008.

(Continued)

*Primary Examiner* — Anthony Salata
(74) *Attorney, Agent, or Firm* — Kinney & Lange, P.A.

(57) ABSTRACT

Power is managed in an elevator system including an elevator hoist motor (12), a primary power supply (20), and an electrical energy storage (EES) system (32). A power demand of the elevator hoist motor is determined, and a state-of-charge (SOC) of the EES system is determined. Power exchanged between the hoist motor, the primary power supply, and the EES system is controlled based on the power demand of the hoist motor and the SOC of the EES system.

18 Claims, 3 Drawing Sheets

(56) References Cited

U.S. PATENT DOCUMENTS

| | | | |
|---|---|---|---|
| 8,083,033 B2 * | 12/2011 | Kallioniemi et al. | 187/290 |
| 8,146,714 B2 * | 4/2012 | Blasko | 187/290 |
| 8,172,042 B2 * | 5/2012 | Wesson et al. | 187/382 |
| 8,220,590 B2 * | 7/2012 | Chen et al. | 187/290 |
| 2001/0008195 A1 | 7/2001 | Tajima et al. | |
| 2001/0011618 A1 | 8/2001 | Tajima et al. | |
| 2001/0017238 A1 | 8/2001 | Tajima et al. | |
| 2001/0017239 A1 | 8/2001 | Tajima et al. | |
| 2002/0053490 A1 | 5/2002 | Banno et al. | |
| 2011/0144810 A1 * | 6/2011 | Wesson et al. | 700/275 |
| 2011/0208360 A1 * | 8/2011 | Oggianu et al. | 700/275 |
| 2011/0226559 A1 * | 9/2011 | Chen et al. | 187/290 |

FOREIGN PATENT DOCUMENTS

| | | | |
|---|---|---|---|
| JP | 2001240319 A | 9/2001 | |
| JP | 2001261246 A | 9/2001 | |
| JP | 2005343574 A | 12/2005 | |
| JP | 2007254096 A | 10/2007 | |
| KR | 20010062811 A | 7/2001 | |
| KR | 20020036654 A | 5/2002 | |
| WO | 2007044000 A | 4/2007 | |
| WO | 2007077288 A | 7/2007 | |
| WO | 2010012859 A1 | 2/2010 | |

OTHER PUBLICATIONS

Office Action of the Korean Patent Office in Application No. 10-2011-7005816, dated Aug. 21, 2012.

European Patent Office, Extended European Search Report, Feb. 27, 2013, 6 pages.

Office Action of the Russian Patent Office in application No. 2011102346/11, dated Sep. 21, 2012.

Office Action of the Japanese Patent Office in application No. 2011-522947, dated Nov. 29, 2012.

* cited by examiner

MANAGEMENT OF POWER FROM MULTIPLE SOURCES IN AN ELEVATOR POWER SYSTEM

CROSS-REFERENCE TO RELATED APPLICATION(S)

The present application has disclosure related to co-pending PCT application PCT/US2008/009780, filed on even date with the present application, entitled "Management of Power from Multiple Sources in an Elevator Power System," for Otis Elevator Company, by Stella M. Oggianu, Robert K. Thornton, Vladimir Blasko, William A. Veronesi, Lei Chen, and Daryl J. Marvin.

BACKGROUND

The present invention relates to power systems. More specifically, the present invention relates to a system for managing power from multiple sources to address power demand in an elevator system.

The power demands for operating elevators range from positive, in which externally generated power (such as from a power utility) is used, to negative, in which the load in the elevator drives the motor so it produces electricity as a generator. The use of the motor to produce electricity as a generator is commonly called regeneration. In conventional systems, if the regenerated energy is not provided to another component of the elevator system or returned to the utility grid, it is dissipated through a dynamic brake resistor or other load. In this configuration, all demand remains on the power utility to supply power to the elevator system, even during peak power conditions (e.g., when more than one motor starts simultaneously or during periods of high demand). Thus, components of the elevator system that deliver power from the power utility need to be sized to accommodate peak power demand, which may by more costly and require more space. Also, the regenerated energy that is dissipated is not used, thereby decreasing the efficiency of the power system.

In addition, an elevator drive system is typically designed to operate over a specific input voltage range from a power supply. The components of the drive have voltage and current ratings that allow the drive to continuously operate while the power supply remains within the designated input voltage range. In conventional systems, when the utility voltage sags, the elevator system faults. In conventional systems, when a utility power failure occurs or under poor power quality conditions, the elevator may become stalled between floors in the elevator hoistway until the power supply returns to normal operation.

Elevator drive systems may incorporate a secondary power supply that is controlled to deliver supplemental power to the elevator hoist motor during periods of positive power demand, and store power from the power utility and/or elevator hoist motor during periods of zero or negative power demand. For example, U.S. Pat. No. 6,431,323, Tajima et al., describes an elevator drive system including a power storage apparatus and a controller for controlling charging and discharging operation of the power storage apparatus based on a charging target value (e.g., a charge value based on the time of day). However, this type of control does not provide a direct method for gauging future energy demands of the elevator drive system, and does not control the upper and lower charge limits of the power storage apparatus.

SUMMARY

The present invention relates to managing energy in an elevator system including an elevator hoist motor, a primary power supply, and an electrical energy storage (EES) system. A power demand of the elevator hoist motor is determined, and a state-of-charge (SOC) of the EES system is determined. Power exchanged between the hoist motor, the primary power supply, and the EES system is controlled based on the power demand of the hoist motor and the SOC of the EES system.

DETAILED DESCRIPTION

Figure 1:
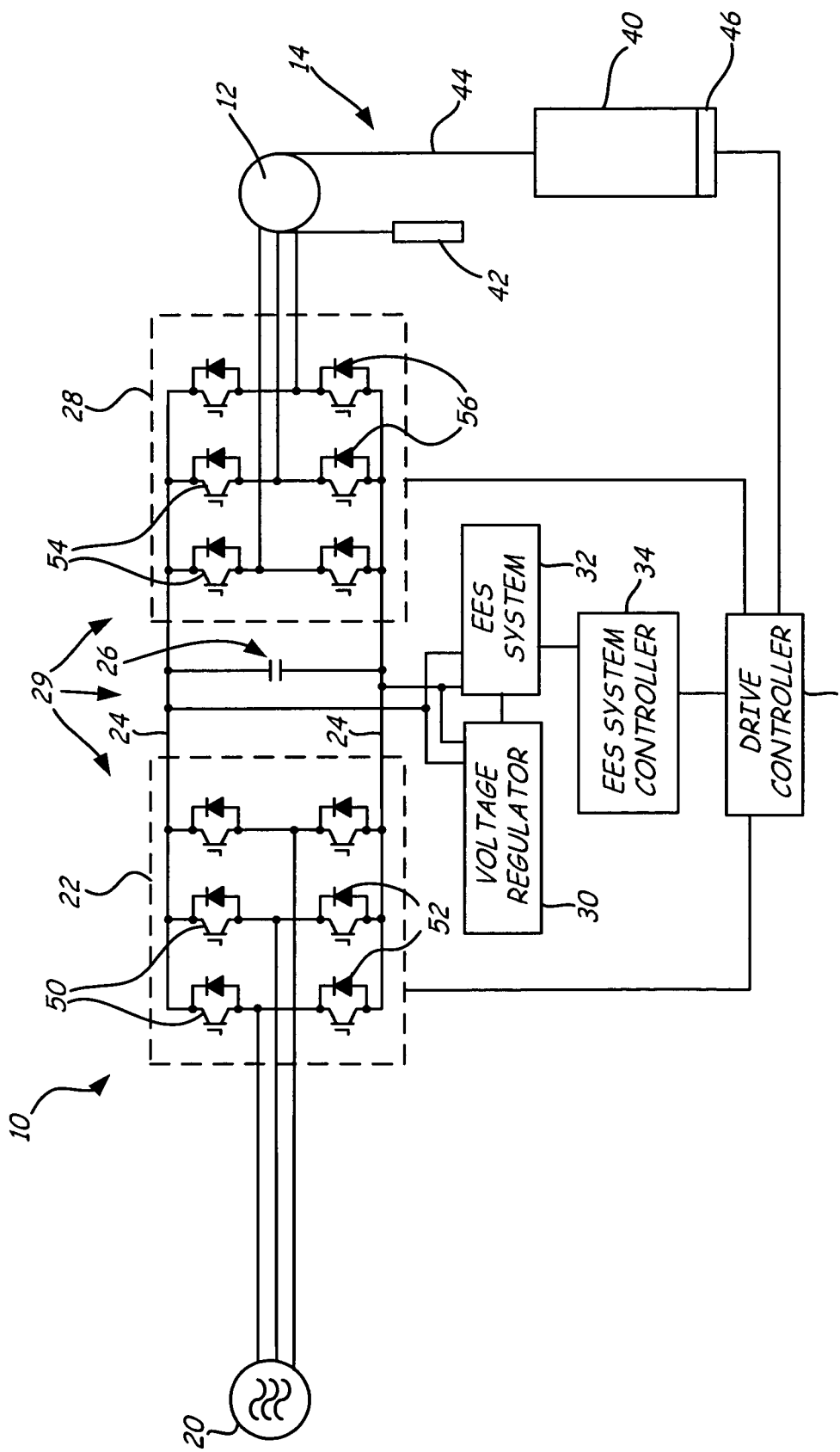
FIG. 1 is a schematic view of an elevator power system including a controller for managing power from multiple sources.

FIG. 1 is a schematic view of power system 10 including primary power supply 20, power converter 22, power bus 24, smoothing capacitor 26, power inverter 28, voltage regulator 30, electrical energy storage (EES) system 32, EES system controller 34, and drive controller 36. Power converter 22, power bus 24, smoothing capacitor 26, and power inverter 28 are included in regenerative drive 29. Primary power supply 20 may be an electrical utility, such as a commercial power source. EES system 30 includes a device or a plurality of devices capable of storing electrical energy. Elevator 14 includes elevator car 40 and counterweight 42 that are connected through roping 44 to hoist motor 12. Elevator 14 also includes load sensor 46, connected to drive controller 36, for measuring the weight of the load in elevator car 40.

As will be described herein, power system 10 is configured to control power exchanged between elevator hoist motor 12, primary power supply 20, and/or EES system 32 as a function of the power demand (positive or negative) of elevator hoist motor 12 and the state-of-charge of EES system 32, and specifications for grid usage. For example, when power demand of elevator hoist motor 12 is positive, power system 10 drives hoist motor 12 from primary power supply 20 and EES system 32 in a ratio that is a function of the magnitude of the demand and the state-of-charge of EES system 32. As another example, when power demand of elevator hoist motor 12 is negative, power system 10 provides the power generated by elevator hoist motor 12 to power supply 20 and EES system 32 in a ratio that is a function of the state-of-charge of EES system 32. Power system 10 also controls distribution of power between primary power supply 20 and EES system 32 when the power demand of elevator hoist motor 12 is approximately zero, and between EES system 32 and elevator hoist motor 12 in the event of failure of primary power supply 20.

Power converter 22 and power inverter 28 are connected by power bus 24. Smoothing capacitor 26 is connected across power bus 24. Primary power supply 20 provides electrical power to power converter 22. Power converter 22 is a three-phase power inverter that is operable to convert three-phase AC power from primary power supply 20 to DC power. In one embodiment, power converter 22 comprises a plurality of power transistor circuits including parallel-connected transistors 50 and diodes 52. Each transistor 50 may be, for example, an insulated gate bipolar transistor (IGBT). The controlled electrode (i.e., gate or base) of each transistor 50 is connected to drive controller 36. Drive controller 36 controls the power transistor circuits to convert the three-phase AC power from primary power supply 20 to DC output power. The DC output power is provided by power converter 22 on power bus 24. Smoothing capacitor 26 smoothes the rectified power provided by power converter 22 on DC power bus 24. It is important to note that while primary power supply 20 is shown as a three-phase AC power supply, power system 10 may be adapted to receive power from any type of power source, including (but not limited to) a single phase AC power source and a DC power source.

The power transistor circuits of power converter 22 also allow power on power bus 24 to be inverted and provided to primary power supply 20. In one embodiment, drive controller 36 employs pulse width modulation (PWM) to produce gating pulses so as to periodically switch transistors 50 of power converter 22 to provide a three-phase AC power signal to primary power supply 20. This regenerative configuration reduces the demand on primary power supply 20.

Power inverter 28 is a three-phase power inverter that is operable to invert DC power from power bus 24 to three-phase AC power. Power inverter 28 comprises a plurality of power transistor circuits including parallel-connected transistors 54 and diodes 56. Each transistor 54 may be, for example, an insulated gate bipolar transistor (IGBT). The controlled electrode (i.e., gate or base) of each transistor 54 is connected to drive controller 36, which controls the power transistor circuits to invert the DC power on power bus 24 to three-phase AC output power. The three-phase AC power at the outputs of power inverter 28 is provided to hoist motor 12. In one embodiment, drive controller 36 employs PWM to produce gating pulses to periodically switch transistors 54 of power inverter 28 to provide a three-phase AC power signal to hoist motor 12. Drive controller 36 may vary the speed and direction of movement of elevator 14 by adjusting the frequency, phase, and magnitude of the gating pulses to transistors 54.

In addition, the power transistor circuits of power inverter 54 are operable to rectify power that is generated when elevator 14 drives hoist motor 12. For example, if hoist motor 12 is generating power, drive controller 36 controls transistors 54 in power inverter 28 to allow the generated power to be converted and provided to DC power bus 24. Smoothing capacitor 26 smoothes the converted power provided by power inverter 28 on power bus 24. The regenerated power on DC power bus 24 may be used to recharge the storage elements of EES system 32, or may be returned to primary power supply 20 as described above.

Hoist motor 12 controls the speed and direction of movement between elevator car 40 and counterweight 42. The power required to drive hoist motor 12 varies with the acceleration and direction of elevator 14, as well as the load in elevator car 40. For example, if elevator car 40 is being accelerated, run up with a load greater than the weight of counterweight 42 (i.e., heavy load), or run down with a load less than the weight of counterweight 42 (i.e., light load), power is required to drive hoist motor 12. In this case, the power demand for hoist motor 12 is positive. If elevator car 40 runs down with a heavy load, or runs up with a light load, elevator car 40 drives hoist motor 12 and regenerates energy. In this case of negative power demand, hoist motor 12 generates AC power that is converted to DC power by power inverter 28 under the control of drive controller 36. As described above, the converted DC power may be returned to primary power supply 20, used to recharge EES system 32, and/or dissipated in a dynamic brake resistor connected across power bus 24. If elevator 14 is leveling or running at a fixed speed with a balanced load, it may be using a lesser amount of power. If hoist motor 12 is neither motoring nor generating power, the power demand of hoist motor 12 is approximately zero.

It should be noted that while a single hoist motor 12 is shown connected to power system 10, power system 10 can be modified to power multiple hoist motors 12. For example, a plurality of power inverters 28 may be connected in parallel across power bus 24 to provide power to a plurality of hoist motors 12. In addition, while EES system 32 is shown connected to DC power bus 24, EES system 32 may alternatively be connected to one phase of the three phase input of power converter 22.

EES system 32 may include one or more devices capable of storing electrical energy that are connected in series or parallel. In some embodiments, EES system 32 includes at least one supercapacitor, which may include symmetric or asymmetric supercapacitors. In other embodiments, EES system 32 includes at least one secondary or rechargeable battery, which may include any of nickel-cadmium (NiCd), lead acid, nickel-metal hydride (NiMH), lithium ion (Li-ion), lithium ion polymer (Li-Poly), iron electrode, nickel-zinc, zinc/alkaline/manganese dioxide, zinc-bromine flow, vanadium flow, and sodium-sulfur batteries. In other embodiments, other types of electrical or mechanical devices, such as flywheels, can be used to store energy. EES system 32 may include one type of storage device or may include combinations of storage devices.

Power system 10 addresses the power demand of hoist motor 12 with both primary power supply 20 and EES system 32. This reduces the overall power demand on primary power supply 20, which permits a reduction in the size (and, consequently, cost) of components that deliver power from primary power supply 20 to power system 10 (e.g., power converter 22). In addition, by controlling the share of power provided by EES system 32 as a function of its state-of-charge, the life of EES system 32 is extended. Furthermore, power system 10 can provide rescue and extended service operation after failure of primary power supply 10 by delivering power to and from EES system 32 to address demand of hoist motor 12.

Figure 2:
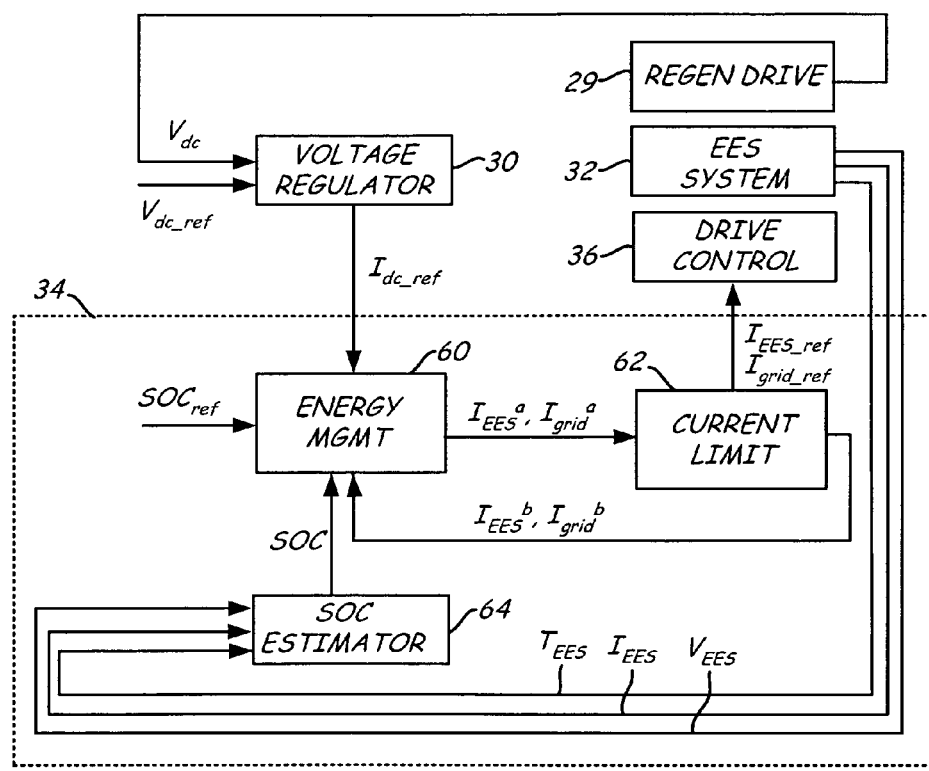
FIG. 2 is a block diagram of an electrical energy storage (EES) system controller for controlling the share of elevator hoist motor demand addressed by a primary power supply and the EES system.

FIG. 2 is a block diagram of EES system controller 34 for controlling the share of demand of elevator hoist motor 12 addressed by primary power supply 20 and EES system 32. EES system controller 34 includes energy management module 60, current limit module 62, and state-of-charge (SOC) estimator 64. Regenerative drive 29 provides power bus voltage signal $V_{dc}$ to voltage regulator 30, which also receives reference voltage signal $V_{dc\_ref}$ as an input. Voltage regulator 30 provides reference current signal $I_{dc\_ref}$ to energy management module 60, which also receives reference state-of-charge signal $SOC_{ref}$ as an input. Energy management module 60 provides current signals $I_{EES}^{a}$ and $I_{grid}^{a}$ to current limit module 62, which feeds current signals $I_{EES}^{b}$ and $I_{grid}^{b}$ back to energy management module 60. SOC estimator 64, which receives temperature signal $T_{EES}$, current signal $I_{EES}$, and voltage signal $V_{EES}$ from EES system 32, provides EES system state-of-charge signal SOC to energy management module 60. Current limit module 62 provides EES system current reference signal $I_{EES\_ref}$ and primary power supply current reference signal $I_{grid\_ref}$ to drive controller 36.

Figure 3:
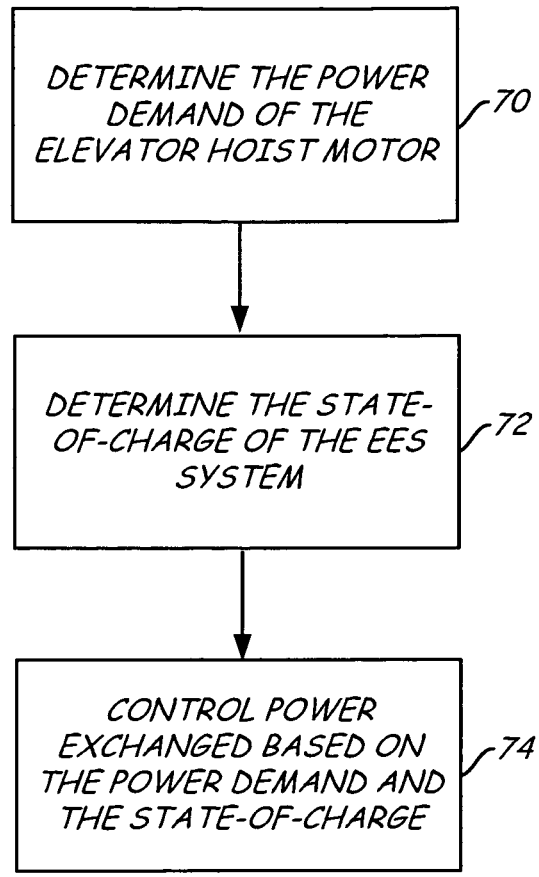
FIG. 3 is a flow diagram of a process for managing power exchanged between the elevator hoist motor, primary power supply, and electrical energy storage (EES) system.

FIG. 3 is a flow diagram of a process for managing power exchanged between the elevator hoist motor 12, primary power supply 20, and EES system 32. When elevator 14 is put into operation, the power demand of elevator hoist motor 12 is determined (step 70). In some embodiments, voltage regulator 30 measures the voltage $V_{dc}$ of power bus 24 to determine whether the power demand of hoist motor 12 is positive, negative, or idle. In other embodiments, drive controller 36 measures the weight of the load in elevator car 40 (using load sensor 46) to determine the power demand of hoist motor 12. In yet other systems, direct or indirect estimates of instantaneous torque and achieved acceleration are compared with desired acceleration values to calculate power demand.

SOC estimator module 64 then estimates the SOC of EES system 32 (step 72). The estimated SOC of EES system 32 is based on any or all of voltage $V_{EES}$, current $I_{EES}$, and temperature $T_{EES}$ of EES system 32. These parameters, which are received as inputs to SOC estimator module 64, are used to estimate the SOC of EES system 32. A signal related to the estimated SOC of EES system 32 is provided to energy management module 60.

The power exchanged between hoist motor 12, primary power supply 20, and EES system 32 is then controlled based on the power demand of hoist motor 12 and the state-of-charge of EES system 32 (step 74). Voltage regulator 30 generates a power bus reference current signal $I_{dc\_ref}$ based on the voltage $V_{dc}$ of power bus 24 and a reference power bus voltage signal $V_{dc\_ref}$ to establish the power demand of hoist motor 12 that needs to be addressed. If the power demand of hoist motor 12 is positive or negative, energy management module 60 determines the share of hoist motor power demand addressed by each of primary power supply 20 and EES system 32. The algorithm employed by energy management module 60 to determine the proportion of power demand addressed by primary power supply 20 and EES system 32 will be described in more detail below. Energy management module 60 generates current reference signals $I_{EES}{}^a$ and $I_{grid}{}^a$ related to the power demand share to be addressed by EES system 32 and primary power supply 20, respectively, and provides these signals to current limit module 62. Current limit module 62 determines whether current reference signals $I_{EES}{}^a$ and $I_{grid}{}^a$ are above current thresholds set for EES system 32 and primary power supply 20, respectively. If current reference signals are above the thresholds, current limit module 62 recalculates the current reference signals to be at or below the thresholds and provides reference current signals $I_{EES}{}^b$ and $I_{grid}{}^b$, for EES system 32 and primary power supply 20, respectively. When energy management module 60 provides reference current signals $I_{EES}{}^a$ and $I_{grid}{}^a$ that are below the current thresholds, reference current signals $I_{EES\_ref}$ and $I_{grid\_ref}$, related to the power demand share for EES system 32 and primary power supply 20, respectively, are provided to drive controller 36. $I_{EES\_ref}$ and $I_{grid\_ref}$ combined completely address the power demand of hoist motor 12 as established by power bus reference current $I_{dc\_ref}$. Drive controller 36 then controls regenerative drive 29 and EES system controller 34 to address the power demand of hoist motor 12 with EES system 32 and primary power supply 20 in proportion with the reference current signals $I_{EES\_ref}$ and $I_{grid\_ref}$ respectively. More particularly, EES system 32 addresses the proportion of hoist motor power demand expressed as $I_{EES\_ref}/I_{dc\_ref}$ and primary power supply 20 addresses the proportion of hoist motor power demand expressed as $I_{grid\_ref}/I_{dc\_ref}$.

As discussed above, energy management module 60 calculates the contributions of EES system 32 and primary power supply 20 toward addressing the power demands of elevator hoist motor 12. When the hoist motor power demand is positive, energy management module 60 first determines whether the power demand is lower than a minimum threshold value, based on the magnitude of the power bus reference current signal $I_{dc\_ref}$. If the power demand is less than or equal to the minimum threshold value, energy management module 60 generates reference current signals $I_{EES}{}^a$ and $I_{grid}{}^a$ that provide that all power demand is to be addressed by primary power supply 20. This approach maintains the charge of EES system 32 while the draw on primary power supply 20 is minimal.

Under normal conditions, when power demand is greater than the minimum threshold value, energy management module 60 calculates the proportion of power supplied by primary power supply 20 and EES system 32 based on the SOC of EES system 32. The SOC of EES system 32 is controlled to maintain the SOC within a SOC range. In some embodiments, less of the total power demand for elevator hoist motor 12 is addressed by EES system 32 as the SOC decreases. By controlling the swing charge limits of EES system 32, the life of EES system 32 is prolonged.

Figure 4:
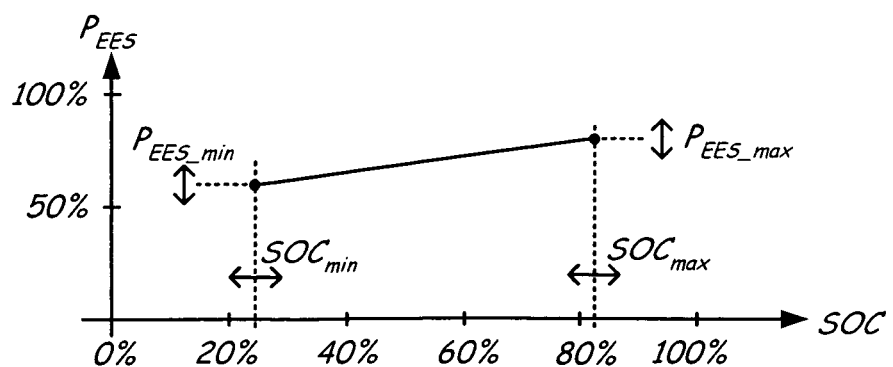
FIG. 4 is a graph of the proportion of power demand addressed by the EES system as a function of the state-of-charge (SOC) of the EES system.

To illustrate, FIG. 4 is a graph of a proportion of power demand addressed by EES system 32 as a function of the SOC of EES system 32. In FIG. 4, the SOC of EES system 32 is maintained between about a minimum state-of-charge $SOC_{min}$ and a maximum state-of-charge $SOC_{max}$. By way of example, $SOC_{min}$ is shown in FIG. 4 as about 23% of capacity and $SOC_{max}$ is shown as about 82% of capacity. Energy management module 60 provides signals to supply about 60% of the power to hoist motor 12 from EES system 32 at the lower limit of the range ($P_{EES\_min}$). The proportion supplied by EES system 12 changes linearly to the upper limit of the range ($P_{EES\_max}$), where energy management module 60 provides signals to supply about 80% of the power to hoist motor 12 from EES system 32. The settings for $SOC_{min}$, $SOC_{max}$, $P_{EES\_min}$, and $P_{EES\_max}$ may be adjusted to optimize performance of power system 10, as indicated by the arrows adjacent each of these labels in FIG. 4.

If the SOC of EES system 32 falls below $SOC_{min}$ while the power demand of hoist motor 12 is positive, energy management module 60 may provide signals to cause all power to be supplied by primary power supply 20 until EES system 32 is recharged. In order to minimize the effect of the power drawn from primary power supply 20 on the power supply during this time, the velocity of elevator car 40 may be adjusted to reduce the power demand of hoist motor 12.

When power demand for hoist motor 12 is negative, a similar algorithm is applied to return regenerated power from the hoist motor 12 to primary power supply 20 and EES system 32. That is, regenerated power is returned to primary power supply 20 and EES system 32 in a ratio that is a function of the SOC of EES system 32. When the SOC of EES system 32 is at or below a minimum threshold SOC, energy management module 60 generates signals that cause all energy regenerated by hoist motor 12 to be stored in EES system 32. The minimum threshold SOC may or may not be the same as $SOC_{min}$ shown in FIG. 4. For example, it may be preferred to start storing all regenerated energy to EES system 32 before $SOC_{min}$ is reached to assure that the SOC of EES system 32 does not fall below $SOC_{min}$.

When the SOC of EES system 32 is at or above a maximum threshold SOC, energy management module 60 generates signals that cause all energy regenerated by hoist motor 12 to be delivered to primary power supply 20. The maximum threshold SOC may or may not be the same as $SOC_{max}$ shown in FIG. 4. For example, it may be preferred to start delivering all regenerated power to primary power supply 20 before $SOC_{max}$ is reached to assure that the SOC of EES system 32 does not exceed $SOC_{max}$. In order to minimize the effect of the power delivered to primary power supply 20 on the power supply during this time, the velocity of elevator car 40 may be adjusted to reduce the power demand of hoist motor 12.

When the SOC of EES system 32 is between the minimum threshold SOC and the maximum threshold SOC, energy management module 60 generates signals that cause regenerated power to be delivered to both primary power supply 20 and EES system 32 in a ratio that is a function of the SOC of EES system 32. In some embodiments, a greater fraction of the regenerated power is delivered to EES system 32 when the SOC is closer to the minimum threshold SOC than when the SOC is closer to the maximum threshold SOC.

When the power demand of hoist motor 12 is approximately zero (that is, hoist motor 12 is neither motoring nor regenerating power), energy management module 60 monitors the SOC of EES system 32 and generates signals to cause primary power supply 20 to provide power to EES system 32 as a function of the SOC of EES system 32. In some embodiments, the power provided by primary power supply 20 to EES system 32 is determined by:

$$P_{grid\_idle} = \frac{SOC_{max} - SOC}{SOC_{max} - SOC_{min}} P_{grid\_max\_idle} \qquad \text{(Equation 1)}$$

where $SOC_{min}$ and $SOC_{max}$ define the SOC range within which EES system 32 is maintained, and $P_{grid\_max\_idle}$ is the maximum power that can be drawn from primary power supply 20 when the power demand is approximately zero. Thus, when the SOC of EES system 32 is greater than or equal to $SOC_{max}$, no further power is provided to EES system 32 from primary power supply 20.

In the event of a failure of primary power supply 20, EES system 32 addresses all demand of hoist motor 12. Energy management module 60 monitors the SOC of EES system 32 and generates signals to cause EES system 32 to provide all energy required to drive hoist motor 12 during periods of positive demand when the SOC is above a rescue operation minimum threshold SOC. For example, EES system 32 may drive hoist motor 12 as long as the SOC of EES system 32 is above 20% of capacity SOC. In addition, energy management module 60 generates signals to cause EES system 32 to store all energy generated by hoist motor 12 during periods of negative demand when the SOC is below a rescue operation maximum threshold SOC. For example, EES system 32 may store all energy generated by hoist motor 12 as long as the SOC of EES system 32 is below 90% of capacity SOC. When the SOC of EES system 32 is above the rescue operation maximum threshold SOC, any additional power generated by hoist motor 12 may be dissipated with a dynamic brake resistor or the like or the elevator may be stopped. By controlling the SOC range in which EES system 32 operates during failure of primary power supply 20, the life of EES system 32 is prolonged.

In an alternative embodiment, energy management module 60 controls the ratio of hoist motor power demand addressed by primary power supply 20 and EES system 32 based on a set power distribution ratio. In this embodiment, energy management module 60 generates signals that cause primary power supply 20 to address a set percentage of the power demand of hoist motor 12, while EES system 32 addresses the remaining portion of the hoist motor power demand. This set percentage is maintained regardless of the SOC of EES system 32, but the set percentage may be adjusted to optimize performance of power system 10.

During periods of positive hoist motor power demand, primary power supply 20 provides the set percentage of power to drive hoist motor 12, and EES system 32 provides the remaining power necessary to satisfy demand. In order to further control the size of the components that deliver power from primary power supply 20, a maximum power threshold may be enforced by energy management module 60 that establishes a maximum amount of power supplied from primary power supply 20 during periods of positive elevator hoist motor demand.

During periods of negative hoist motor power demand, the set percentage of power generated by hoist motor 12 is delivered to primary power supply 20. The remaining power generated by hoist motor 12 is delivered to EES system 32. EES system control 34 may also consider the SOC of EES system 32 when determining how much of the regenerated power to store in EES system 32. For example, if the SOC is approaching the upper limit of the SOC range within which EES system 32 is maintained, a portion of the regenerated power may be dissipated on DC power bus 24, for example by dissipating power in a dynamic brake resistor.

When power demand of hoist motor 12 is approximately zero (i.e., hoist motor 12 is idle), energy management module 60 generates signals that cause primary power supply 20 to recharge EES system 32. The amount of power supplied by primary power supply 20 to EES system 32 may be a function of the SOC of EES system 32, such as is expressed in Equation 1 above.

During a failure of primary power supply 20, EES system 32 addresses all power demand for hoist motor 12. Thus, if power demand for hoist motor 12 is positive, EES system 32 supplies power to satisfy all demand, and if power demand for hoist motor 12 is negative, EES system 32 stores all power generated by hoist motor 12. Similar to the embodiment described above, EES system 32 may be controlled to address hoist motor power demand as a function of the SOC of EES system 32 and only while the SOC of EES system 32 is within a certain range.

In summary, the present invention relates to managing power in an elevator system including an elevator hoist motor, a primary power supply, and an electrical energy storage (EES) system. A power demand of the elevator hoist motor is determined, and a state-of-charge (SOC) of the EES system is measured. Power exchanged between the hoist motor, the primary power supply, and the EES system is controlled based on the power demand of the hoist motor and the SOC of the EES system. By controlling the amount of power demand addressed by the primary power supply, the size and cost of components of the power system that delivers power from the primary power supply may be reduced. In addition, the life of the EES system may be extended by controlling the SOC range of the EES system.

Although the present invention has been described with reference to preferred embodiments, workers skilled in the art will recognize that changes may be made in form and detail without departing from the spirit and scope of the invention.

The invention claimed is:

1. A method for managing power in an elevator system including an elevator hoist motor, a primary power supply, and an electrical energy storage (EES) system, the method comprising:

determining a power demand of the elevator hoist motor;

determining a state-of-charge (SOC) of the EES system; and controlling power exchanged between the hoist motor, the primary power supply, and the EES system based on the power demand of the hoist motor and the SOC of the EES system;

wherein, when the power demand of the elevator hoist motor is negative, the controlling step comprises:

storing all energy generated by the elevator hoist motor in the EES system if the SOC of the EES system is below a minimum threshold SOC;

delivering all energy generated by the elevator hoist motor to the primary power supply if the SOC of the EES system is above a maximum threshold SOC; and distributing the energy generated by the elevator hoist motor between the primary power supply and the EES system when the SOC of the EES system is between the minimum threshold SOC and the maximum threshold SOC, wherein the energy is distributed in a ratio that is a function of the SOC of the EES system.

2. The method of claim 1, wherein, when the power demand of the elevator hoist motor is positive, the controlling step comprises:

supplying power to the hoist motor completely from the primary power supply if the power demand is less than or equal to a minimum threshold power demand; and supplying power to the hoist motor from both the primary power supply and the EES system if the power demand is greater than the minimum threshold power demand, wherein a ratio of power supplied from the primary power supply and the EES system is a function of the SOC of the EES system.

3. The method of claim 2, wherein, if the SOC of the EES system is outside a SOC range and the power demand is greater than the minimum threshold power demand, operation of the hoist motor is adjusted to modify the power demand.

4. The method of claim 1, wherein, when the power demand of the elevator hoist motor is approximately zero, the controlling step comprises:

storing energy from the primary power supply to the EES system while the SOC of the EES system is below a maximum threshold SOC.

5. The method of claim 1, wherein, upon failure of the primary power supply, the EES system drives the elevator hoist motor when the power demand is positive and the SOC of the EES system is above a minimum threshold SOC, and the EES system stores power from the elevator hoist motor when the power demand is negative and the SOC of the EES system is below a maximum threshold SOC.

6. The method of claim 1, wherein determining a state-of-charge (SOC) of the EES system comprises measuring at least one of a current, a voltage, and a temperature of the EES system.

7. A system for managing power in an elevator system including an elevator hoist motor, a primary power supply, and an electrical energy storage (EES) system connected to a regenerative drive, the system comprising:

a first circuit that determines a power demand of the elevator hoist motor;

a second circuit that adapted to determines a state-of-charge (SOC) of the EES system; and a control module operable to control the regenerative drive based on the power demand of the hoist motor and the SOC of the EES system to control power exchanged between the hoist motor, the primary power supply, and the EES system;

wherein, when the power demand of the elevator hoist motor is negative, the control module controls the regenerative drive to (1) store all energy generated by the elevator hoist motor in the EES system if the SOC of the EES system is below a minimum threshold SOC, (2) deliver all energy generated by the elevator hoist motor to the primary power supply if the SOC of the EES system is above a maximum threshold SOC, or (3) distribute the energy generated by the elevator hoist motor between the primary power supply and the EES system when the SOC of the EES system is between the minimum threshold SOC and the maximum threshold SOC, wherein the energy is distributed in a ratio that is a function of the SOC of the EES system.

8. The system of claim 7, wherein, when the power demand of the elevator hoist motor is positive, the control module controls the regenerative drive to either (1) supply power to the hoist motor completely from the primary power supply if the power demand is less than or equal to a minimum threshold power demand, or (2) supply power to the hoist motor from both the primary power supply and the EES system if the power demand is greater than the minimum threshold power demand, wherein a ratio of power supplied from the primary power supply and the EES system is a function of the SOC of the EES system.

9. The system of claim 8, wherein, if the SOC of the EES system is outside a SOC range and the power demand is greater than the minimum threshold power demand, operation of the hoist motor is adjusted to modify the power demand.

10. The system of claim 7, wherein, when the power demand of the elevator hoist motor is approximately zero, the control module controls the regenerative drive to store energy from the primary power supply in the EES system while the SOC of the EES system is below a maximum threshold SOC.

11. The system of claim 7, wherein, upon failure of the primary power supply, the control module controls the EES system to drive the elevator hoist motor when the power demand is positive and the SOC of the EES system is above a minimum threshold SOC, and wherein the control module further controls the EES system to store power from the elevator hoist motor when the power demand is negative and the SOC of the EES system is below a maximum threshold SOC.

12. The system of claim 7, wherein the second circuit determines SOC as a function of at least one of a current, a voltage, and a temperature of the EES system.

13. A method for managing power in an elevator system including an elevator hoist motor, a primary power supply, and an electrical energy storage (EES) system, the method comprising:

supplying power to the hoist motor from the primary power supply and the EES system when a hoist motor power demand is positive, wherein a ratio of power supplied from the primary power supply and the EES system is a function of a magnitude of the hoist motor power demand and a state-of-charge SOC of the EES system; and distributing energy generated by the elevator hoist motor between the primary power supply and the EES system when the hoist motor power demand is negative, wherein the energy is distributed in a ratio that is a function of the hoist motor power demand and the SOC of the EES system.

14. The method of claim 13, wherein the supplying step comprises:

supplying power to the hoist motor completely from the primary power supply if the power demand is less than or equal to a minimum threshold power demand.

15. The method of claim 13, wherein the distributing step comprises:

storing all energy generated by the elevator hoist motor in the EES system if the SOC of the EES system is below a minimum threshold SOC; and delivering all energy generated by the elevator hoist motor to the primary power supply if the SOC of the EES system is above a maximum threshold SOC.

16. The method of claim 13, and further comprising:
storing energy from the primary power supply to the EES system when the hoist motor power demand is approximately zero and while the SOC of the EES system is below a maximum threshold SOC.

17. The method of claim 13, wherein, if the primary power supply fails, the method further comprises:
driving the hoist motor with the EES system when the power demand is positive and the SOC of the EES system is above a minimum threshold SOC; and
storing power to the EES system from the elevator hoist motor when the power demand is negative and the SOC of the EES system is below a maximum threshold SOC.

18. The method of claim 13, wherein the SOC of the EES system is determined as a function of at least one of a current, a voltage, and a temperature of the EES system.

* * * * *